United States Patent [19]
Oxley et al.

[11] 3,741,074
[45] June 26, 1973

[54] VARIABLE RATIO INTEGRAL POWER STEERING GEAR

[75] Inventors: Gerald K. Oxley; Frederick D. Venable, both of Lafayette, Ind.

[73] Assignee: TRW Inc., Cleveland, Ohio

[22] Filed: Dec. 8, 1970

[21] Appl. No.: 96,029

[52] U.S. Cl............ 91/375 A, 60/52 S, 180/79.2 R
[51] Int. Cl. ..... F15b 9/10, F15b 11/08, F16b 13/04
[58] Field of Search.......................... 91/375, 375 A; 60/52 S; 180/79.2 R

[56] References Cited
UNITED STATES PATENTS

| | | | |
|---|---|---|---|
| 2,953,932 | 9/1960 | Lincoln | 180/79.2 R X |
| 3,033,051 | 5/1962 | Reinke et al. | 91/375 X |
| 3,606,819 | 9/1971 | Venable et al. | 91/375 X |

Primary Examiner—Edgar W. Geoghegan
Attorney—Hill, Sherman, Meroni, Gross & Simpson

[57] ABSTRACT

A variable ratio power steering gear assembly including a rack-piston and a cross-shaft mounted sector gear meshing with the teeth of the rack piston. The teeth of the sector gear are generated on a pitch radius which increases from the center to the ends of the gear to provide a steering ratio which increases from the center to the end steering positions of the assembly.

6 Claims, 5 Drawing Figures

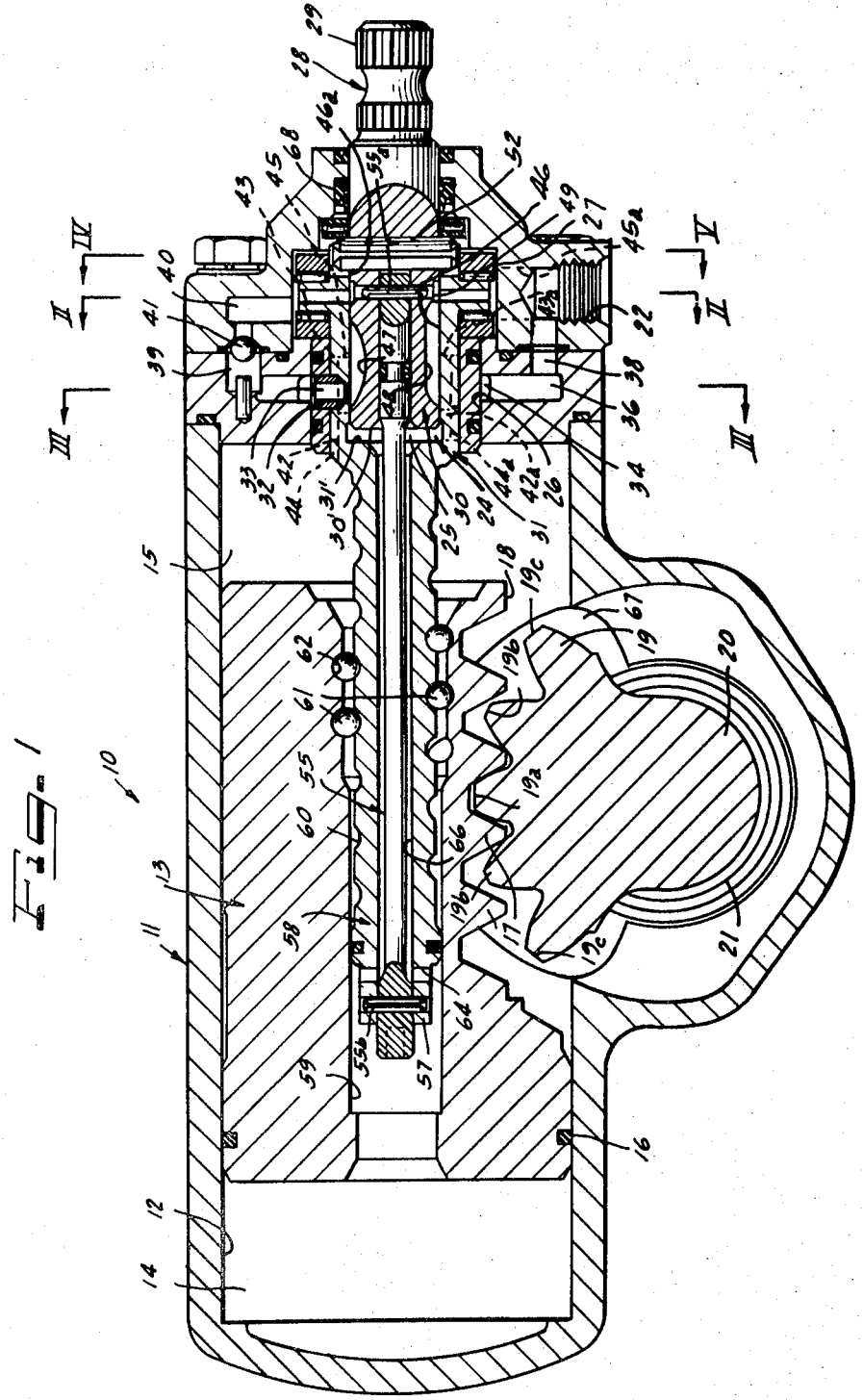

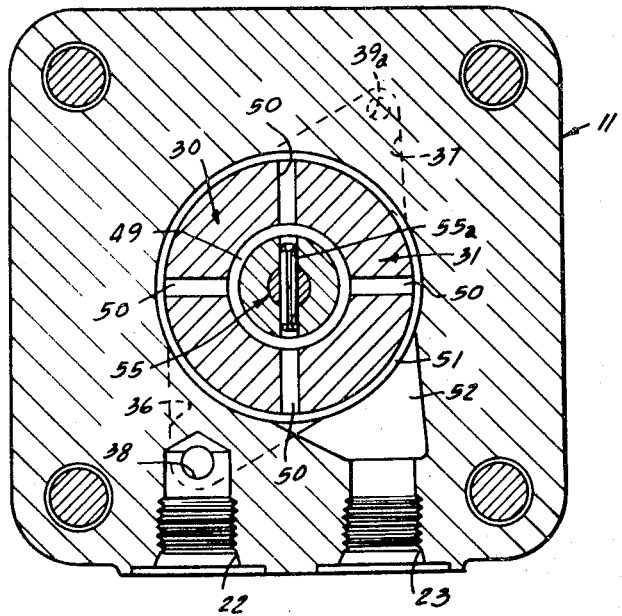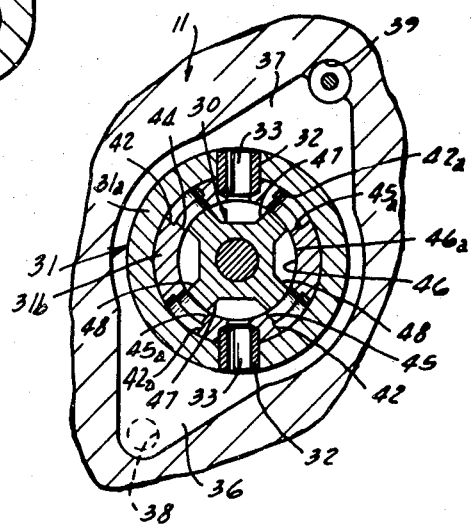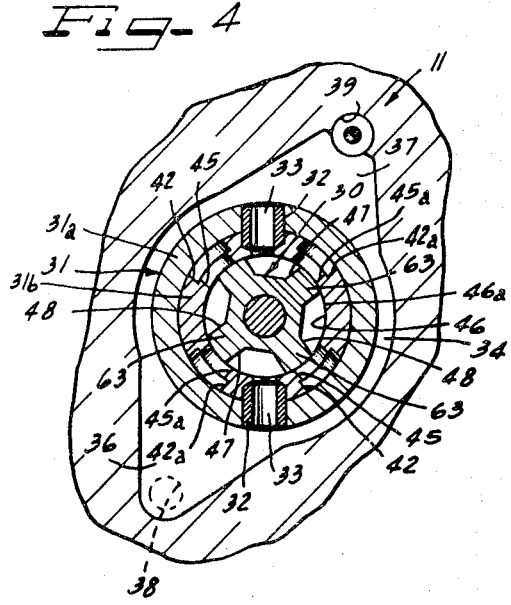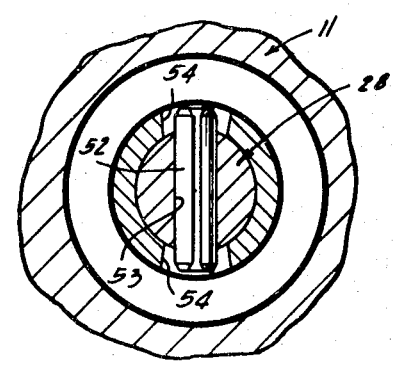

VARIABLE RATIO INTEGRAL POWER STEERING GEAR

BACKGROUND OF THE INVENTION

Field of the Invention

This invention relates generally to the field of vehicular steering gear and more particularly to a variable ratio integral power steering gear assembly in which the steering ratio increases as the assembly is turned from the center to the end positions thereof.

Years ago almost all vehicular steering systems were of the manual type. In automotive steering systems, for example, all of the force required to turn the dirigible wheels was supplied manually by the vehicle operator. As automobiles and other vehicles became larger and heavier, however, and upon the advent of balloon tires, the turning force requirements increased to a higher and higher level. Steering systems were thereupon modified to employ gear arrangements which provided a relatively high mechanical advantage to the steering effort so that the torque required to turn the steered wheels was not beyond the capability of the average driver. Such mechanical advantage is generally referred to as steering ratio, which may be defined as the ratio of degrees of turn of the steering wheel or spindle to degrees of turn of the steered wheels. Thus a high steering ratio requires the steering wheel to be turned through a greater arc per degree of turn of the steered wheels than does a low steering ratio.

In order to meet the torque capabilities of the average driver steering gear ratios of 26:1 or greater became common. Furthermore, since the torque at the steering gear required to turn the dirigible wheels increases as the wheels are turned from the center to the lock or end position thereof, many of the manual steering systems were constructed to provide a variable steering ratio which increased to 30:1 near the end positions of the steered wheels. Such systems remain in use today on existing vehicles and are being designed into new vehicles.

Variable ratio manual steering systems which provide a low steering ratio in the center steering positions thereof and a high ratio toward the end steering positions tend to maintain the manual steering or input torque requirements at a substantially constant value (since the output torque requirements are maintained substantially constant) and within the capability of the average driver as the steered wheels are turned through any angle between the lock-to-lock positions thereof.

The foregoing constancy in input and output torque requirements enable the average driver to more easily turn the wheels through any angle from the lock-to-lock positions of the steered wheels. Turning requirements generally increase toward the lock positions of the steered wheels due to the design of the steering linkage which requires greater torque per degree of turn as the wheels are turned away from straight ahead. Torque requirements are also usually greater near the lock positions in a moving vehicle due to the inherent force tending to straighten the wheels.

Variable ratio manual steering systems of the low center ratio, high end ratio type have one drawback, however, due to the number of turns of the steering wheel necessary to move the steered wheels from one end position to the other. For example, variable ratio manual steering systems which require six or more complete revolutions of the steering wheel to turn the steered wheels from one end position to another are not uncommon.

When power steering systems came into general use a variation in steering ratio was no longer required for the purpose of reducing torque input to the steering wheel. It became widely recognized, however, during the period of transition of manual to power steering, that variations in steering ratios may be desirable for completely different reasons.

First of all, the average driver apparently obtained a better steering "feel" if the steering wheel had to be turned approximately the same number of degrees per degree of turn of the steered wheels as he was accustomed to with a manual steering system, at least under straight-ahead driving conditions where only relatively minor corrections are required. Under parking conditions, however, during which the steered wheels must often be turned back and forth, time and motion could be reduced by reducing the steering ratio toward the end positions.

Since power steering has been in use for some time, the problem encountered in providing a satisfactory steering "feel" is no longer of great moment. Furthermore, the current trend in vehicular design is to provide greater and greater compactness. In passenger car design, for example, the effort is being made to reduce the size of the equipment under the hood to provide a lower and lower silhouette but at the same time a greater demand is being made to place more and more equipment under the hood. Thus while the demand for air conditioning systems, power brakes, power steering and other such features is increasing, a parallel effort is being made to reduce the size of the equipment. In truck applications, even in the medium and heavy range, efforts are being made to reduce equipment weight to increase the allowable payload, therefore, in respect of compactness and weight reduction in steering gear, parallel efforts are being made in passenger car and truck design.

It is readily apparent that power steering systems which employ a high center steering ratio and a low end steering ratio generally do not utilize the power equipment most effectively since torque input and output requirements are not balanced as they are in the previously mentioned manual systems having low-center, high-end steering ratios. Thus, in the center position of the steered wheels, where steering torque requirements are least, the steering ratio is greatest. Conversely, toward the end positions of the steered wheels, where the torque requirements are generally greatest, the steering ratio is least.

In any power steering system, of course, the power piston must be sized to accommodate the greatest torque requirement. For any given fluid pressure, therefore, the power piston in an integral gear system must be sized to meet the maximum torque requirement which obtains at the end positions of the steered wheels. The piston is therefore generally greatly oversized in the center position of the steered wheels. It is apparent, therefore, that the variable ratio of power steering systems, in order to more closely balance torque capability and torque requirements, should provide for low ratio in the center and high ratio toward the end positions of the steered wheels.

The present invention provides means for simply yet effectively accomplishing such variable ratio in an integral gear power steering system and for effectively increasing the compactness and efficiency of such systems. As mentioned hereinabove, the driving public no longer requires the inefficient reverse ratio heretofore employed in power steering systems to provide a satisfactory "feel" of the road.

SUMMARY OF THE INVENTION

The present invention may be summarized as comprising a variable ratio integral gear power steering system which employs an overall steering ratio which increases as the steered wheels are moved from the center to the end positions thereof and which further comprises a rack-piston and a cross-shaft having a sector gear meshing with the rack-piston, the teeth of the rack-piston and the sector gear being arranged to provide such overall variable steering ratio.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a longitudinal cross sectional view of a power steering gear assembly constructed in accordance with the principles of the present invention;

FIG. 2 is a transverse cross sectional view taken along the lines II—II of FIG. 1;

FIG. 3 is a partial transverse cross sectional view taken along lines III—III of FIG. 1;

FIG. 4 is similar to FIG. 3 but discloses the sleeve valves in different positions relative to one another; and FIG. 5 is another partial transverse cross sectional view but is taken along line V—V of FIG. 1.

DESCRIPTION OF THE PREFERRED EMBODIMENT

While the principles of the present invention may be of utility in any fluid operated servomechanism employing an axially shiftable rack-toothed piston and a gear mounted on a rotatable shaft meshing with the teeth of the piston, it finds particular utility in vehicular power steering systems as employed, for example, in medium and heavy truck applications, and the embodiment disclosed herein is described in its relation to a power steering system.

Referring to the drawings, a power steering gear assembly constructed in accordance with the principles of the present invention is indicated generally at reference numeral 10. The assembly 10 comprises a housing 11 having an internal cylindrical wall 12 forming a power cylinder in which is carried for reciprocable sliding motion a piston 13. The piston 13 partitions the power cylinder 12 into a pair of fluid pressure chambers 14 and 15 referred to respectively from time to time hereinafter as the far or outboard pressure chamber and the near or inboard pressure chamber. A sealing member 16 is mounted on the piston 13 to provide a fluid seal between the pressure chambers 14 and 15.

A series of rack teeth 17 are formed along one side 18 of the piston 13 to engage in meshing relation with teeth 19 formed on a sector gear 20. The gear 20 is an integral part of a cross shaft 21 which projects outwardly through a side wall of the housing 11. In vehicular steering applications the cross-shaft 21 may conveniently connect to a pitman arm of the mechanical steering linkage of the vehicle. Thus, as the piston 13 moves back and forth in the power cylinder 12 the sector gear 20 and the cross shaft 21 are rotated accordingly to operate the dirigible wheels of the vehicle, as will be understood by those skilled in the art.

Also formed in the housing 11 is a fluid inlet port 22 and a fluid outlet port 23 which are adapted for connection to suitable hydraulic circuitry including a main fluid power pump assembly. The flow of fluid is directed to and from the pressure chambers 14 and 15 by means of a valve assembly indicated generally at reference numeral 24, portions of which are housed within a chamber 25 defined in part by a reduced diameter cylindrical bore wall 26 and an increased diameter bore wall 27. The valve assembly 24 is actuated by means of a manually operated shaft 28 journalled for rotation in the housing 11 and having an outer end 29 thereof splined to receive a steering wheel or the like lever to facilitate rotation thereof.

The valve assembly 24 may be more particularly characterized as comprising a pair of valve members 30 and 31, which may be referred to respectively as a valve spool and a valve sleeve, telescoped or nested concentrically one within the other and journalled for rotation within the bore walls 26 and 27 relative to the housing 11 and relative to one another. In the illustrated embodiment the outer valve member 31 is shown as comprising a pair of sleeves 31a and 31b pinned together for joint rotation as at reference numerals 32. This two-piece arrangement is for convenience in manufacture and the two components 31a and 31b are considered for purposes herein as a single valve sleeve 31.

The pins 32 are apertured as at 33 and open to a circumferentially continuous groove 34 formed in the bore wall 26 and having a pair of substantially diametrically opposed enlarged portions 36 and 37 which serve as fluid flow passageways. The blower portion 36 communicates with an axial flow passageway 38 to the fluid inlet port 32 and the upper portion 37 communicates through an axial passage 39 with a fluid chamber 40, a ball check 41 being disposed in the passage 39.

Formed in the valve sleeve 31 are a pair of angularly spaced axially extending slots 42 each of which is closed at one end 43 and which opens at another end 44 to the inboard or near pressure chamber 15. Another pair of axially extending slots 42a are disposed respectively between pairs of the slots 42, are closed at a rear end 43a and open at an opposite end 44a into the chamber 25 between an outer end wall 30' of the valve spool 30 and an inner end wall 31' of the valve sleeve 31. In addition, the slots 42 and 42a are in open communication with radially extending apertures 45 and 45a opening to an inner wall 46 of the outer valve sleeve 31.

The valve spool 30 is rotatable within the inner wall 46 and has formed in the peripheral wall 46a thereof a series of axially extending circumferentially spaced grooves indicated at reference numerals 47 and 48. Although the two grooves 47,47 are diametrically opposed with respect to the axis of the valve spool 30 the cross sectional view of FIG. 1 shows one groove 47 and one groove 48 in section merely to illustrate the relative configurative relationship between the two. FIG. 1 is therefore not a true diametrical cross sectional view with respect to the valve assembly 24.

As shown in FIG. 1, grooves 47 are axially elongated sufficiently to communicate the apertures 33 of pins 32 with the radial apertures 45 while grooves 48 are sufficiently axially elongated to communicate radial apertures 45a with an annular groove 49 extending circumferentially continuously about the inner sleeve valve peripheral wall 46a. The groove 49 in turn communicates through a series of radial passages 50 with an annular groove 51 communicating with an enlarged flow passageway 52 in fluid conducting relation with the fluid outlet port 23. It is noted that the chamber 40 is also in fluid communication with the fluid outlet port 23 via the annular groove 51.

The valve spool 30 may be formed integrally with the operating shaft 28 and in any event is connected for joint rotation therewith. Thus, the rotation of the valve spool 30 is directly controlled by the operating shaft 28.

pins the other hand, the valve sleeve 31 is connected to the operating shaft 28 for limited relative rotation by virtue of a pair of driving pins 52 disposed in a transverse bore 53 formed in the operating shaft 28 and projecting at opposite ends into a pair of radially angularly oversized slots 54 formed in the valve sleeve 31. It will thus be appreciated that the operating shaft 28 may rotate through a predetermined angle without effecting rotation of the valve sleeve 31, but thereafter the ends of the driving pins 52 abut the side walls of the slots 54 to cause direct rotation of the valve sleeve 31 in response to further rotation of the operating shaft 28.

FIG. 3 discloses the relative disposition of the inner and outer valve members 30 and 31 when the same are disposed in a neutral or nonoperating position. The valve members 30 and 31 are biased to said neutral portion by means of a torsion rod 55 which is pinned at an inner end 55a to the valve spool 30 for joint rotation therewith and is pinned at an outer end 55b for joint rotation with the outer end 57 of a worm 58 formed integrally with and extending from the inner component 31b of the valve sleeve 31. The worm 58 is disposed in an axial bore 59 formed in the piston 13 and is helically grooved as at 60 to receive a plurality of ball bearings or the like as at 61 shaped complementarily to a helical groove 62 formed in the bore wall 59 of the piston 13. As a result of helical grooves 60 and 62 and the driving balls 61 residing therein the worm 58 is caused to rotate as the piston 13 shifts axially in a manner understood by those skilled in the art.

OPERATION

During operation when, for example, the power steering system 10 is mounted on a vehicle such as a medium or heavy motor truck to control the steering of the dirigible wheels, the inlet and outlet fluid ports 22 and 23 are connected respectively to the discharge and suction sides of the main fluid pump assembly. With the operation shaft 28 in a static condition the valve members 30 and 31 are disposed in the neutral position shown in FIG. 3. In that position of the valve members 30 and 31 the pressurized fluid enters the inlet port 22 and passes through passages 38 and 36 to the groove 34 surrounding the valve sleeve 31. From groove 34 the pressurized fluid flows through apertures 33 formed in the pins 32 and thence to the grooves 47,47 of the valve spool 30.

The radially angular dimensions of land portions 63 which separate grooves 47 and 48 are less than the corresponding dimension of the ports 45 and 45a formed in the inner wall 46 of the valve sleeve 31. Thus, the pressurized fluid flows into grooves 47 and is therefore in communication with pressure chamber 15 of the power cylinder 12 via the axial slots 42. On the other hand, pressure chamber 14 is also in communication with pressurized fluid via the ore 59 formed in the piston 13, a transverse bore 64 formed in the worm 58, an oversized axial bore 66 in which the torsion rod 55 is housed and the slots 42a of the valve sleeve 31, which communicate in turn with the axial grooves 46, the circumferential groove 49, radial passages 50 and the fluid outlet port 23. Since both the grooves 47 and 48 therefore communicate with both the fluid inlet and outlet ports 22 and 23 the pressure in both chambers 14 and 15 is equal and the piston 13 remains in a static state.

Thus, when the operating shaft 28 is not moving, the pressure in chambers 14 and 15 is equalized thereby precluding axial shifting of the piston 13 and rotation of the sector gear 20.

Assume now that the operating shaft 28 is continuously rotated in a clockwise direction, thereby rotating the inner sleeve valve 30 relative to the outer sleeve valve 31 to the position thereof shown in FIG. 4. Now grooves 47,47 of the inner sleeve valve 30 communicate with the pressurized fluid but grooves 48,48 do not. The low pressure or return fluid outlet port 23 communicates with pressure chamber 15 through axial slots 42, axial grooves 48, circumferential groove 49, radial passages 50 and passage 52.

Pressure chamber 14 of the power cylinder 12 communicates with the high pressure fluid inlet port 22 through bore 59 of the piston 13, bores 64 and 66 of the worm 58, the valve chamber 25, axial slots 42a formed in the valve sleeve 31, axial grooves 47 formed in the valve spool 30, the hollow pins 32, the annular groove 34, the axial passage 38 and to the fluid inlet port 22.

The piston 13, because of the pressure differential thereacross, moves rightwardly in the power cylinder 12. This rightward movement of the piston 13 causes the worm 58 to be rotated by virtue of the grooves 60 and 62 and the balls 61 in a direction corresponding to the direction of rotation of the operating shaft 28.

Rotation of the worm 58 causes the valve sleeve 31 to rotate correspondingly while maintaining the same radially angularly offset relation to the valve spool 30 shown in FIG. 4. Thus, while the operating shaft 28 continues to rotate the valve spool 30 also rotates and the valve sleeve 31 "follows" the valve spool 30 while maintaining the angular displacement therewith.

When the operating shaft 28 again comes to rest, rotation of the valve spool 30 immediately ceases. Pressurized fluid from the inlet port 22 is, however, still in communication with the pressure chamber 14 and thus the piston 13 continues to move rightwardly until such movement has rotated the worm 58 and the valve spool 30 to the neutral positions thereof as shown in FIG. 3. The fluid pressure in chambers 14 and 15 is then equalized and axial movement of the piston 13 and rotation of the sector gear 20 ceases.

Rotation of the operating shaft 28 in an opposite direction causes the pressurized fluid to flow in an opposite direction through the power steering gear assembly 10 whereby the pressure chamber 15 is subjected to the high pressure fluid and chamber 14 is subjected to the lower pressure fluid. The pressure differential to which the piston 13 is then subjected has the effect of moving the piston leftwardly as viewed in FIG. 1 and of turning the sector gear 20 accordingly.

A seal member 68 surrounds the operating shaft 28 and, along with the output shaft seal, constitutes the only positive dynamic sealing member utilized in the power steering system 10. The sealing member 68 is subjected only to low pressure fluid under all operating conditions of the system 10. Other sealing members, such as the seal 16, are of the low friction low-leakage type and may comprise elastomeric backed teflon rings.

In the event of failure of the main power fluid supply pump the power steering gear assembly 10 can still be operated to steer the dirigible wheels. In that event, rotation of the operating shaft 28 will cause the pins 52 (FIGS. 1 and 5) to engage the abutment walls of the grooves 54 formed in the outer sleeve valve 31. The hydraulic circuitry through the gear assembly 10 is open by virtue of the angular displacement of the valve members 30 and 31. Ball check 41 opens to allow passage of fluid from cavity 40 to cavity 39 communicating chamber 14 with chamber 15 through passages previously described. Thus, rotation of the operating shaft 28 during manual operation has the effect of rotating the worm 58 correspondingly, which in turn effects axial shifting of the piston 13 and rotation of the sector gear 20.

VARIABLE RATIO

The rack teeth 17 and the sector gear teeth 19 are constructed and arranged to provide variation in the steering ratio of the assembly 10 as the piston 13 and the gear 20 are moved from their respective central positions, i.e., the positions which obtain when the steered wheels are disposed substantially in a "straight ahead" position, to their respective end positions, i.e., the positions which obtain when the steered wheels are disposed at an angle from straight-ahead alignment and toward either of the two lock positions, of positions of maximum turn.

Furthermore, the rack teeth 17 and the sector gear teeth 19 are configured to provide a lower steering ratio in the central position of the device 10 than at either of the two end positions thereof. This arrangement of low ratio-center, high ratio-ends is the same arrangement commonly used in manual steering systems and is used for the same purpose; i.e., to more evenly balance torque capability and torque requirement through all turning angles of the steered wheels. Thus, during straight-ahead driving, the device 10 provides greater response to the steered wheels per degree of turn of the steering wheel, than it does during a turning operation, either cornering or parking.

According to the principles of the present invention, the steering ratio may increase about 20:1 at the centered or straight-ahead position to about 25:1 at the end positions or the positions of maximum turn of the steered wheels.

The increase in torque capability of the device 10 (and in particular, of the cross-shaft 21) at the end positions thereof corresponds to the increase in torque requirements of most steering linkages as the steered wheels are turned more and more toward their lock positions. This increase in torque requirement is inherent in most steering linkage design by virtue of the arrangement and angular disposition of the pitman arm vis-a-vis the rod or other linkage connected thereto. Of course, the steered wheels of a moving vehicle always have a tendency to turn away from the end positions and toward the straight-ahead position by virtue of the natural straightening forces acting on the wheels.

The present invention therefore provides a variable ratio in a power steering system similar to the variable ratio common to manual steering systems, low in the center and high at the ends, and for the same reason, to more closely match torque capability with torque requirement. As a consequence, it will be understood that the cross sectional or motive area of the power piston 13 can be reduced for any given application utilizing a predetermined fluid pressure. Instead of being sized to produce a turning force or torque in the cross-shaft 21 capable of turning the steered wheels in the range of turning angles requiring greatest effort (near the lock positions thereof) and with the least available steering ratio or mechanical advantage, the power piston can be sized to produce the lesser torque in the cross-shaft required to turn the steered wheels in the range of turning angles requiring the least effort (that range embracing straight-ahead driving angles).

Thus, the overall size of the device 10 can be substantially reduced in most applications, an advantage which will generally far outweigh the possible disadvantage arising out of the necessity for turning the steering wheel through a greater number of revolutions.

On the other hand, if is larger motive area of the power piston 13 is maintained, the pressure requirements of the fluid acting thereon can be reduced. A reduction in fluid pressure, of course, will generally permit a main power fluid pump of reduced size. The components which make up the driving connection between the pump and the engine can also be reduced and, of course, the useful power of the engine in increased as a consequence of a reduction in power requirements of the pump.

While variations in steering ratios have in the past been accomplished in several ways, the integral gear power steering system illustrated herein utilizes sector gear teeth 19 which increase in size from the center tooth toward the end teeth. Thus, the pitch radius of the center tooth 19a is less than the pitch radius of teeth 19b which, in turn, is less than the pitch radius of teeth 19c.

On the other hand, the piston rack teeth 17 vary accordingly to accommodate the variations in sector gear teeth 19. For example, the depth of the rack teeth 17 located at the ends of the rack is greater than the depth of the teeth located near the center of the rack.

In accordance with the principles of the invention, it will be understood that the sector gear teeth 19 could all be generated on a single pitch circle and the rack teeth 17 could be modified to produce the lower center ratio, high end ratio of the present invention. Furthermore, the ratio at one end of travel can be greater than at the other end of travel to accommodate applications in which the torque requirements do not increase identically on both sides of the center positions of the wheels.

Thus, the present invention provides a relatively simple and inexpensive manner of varying the ratio of an integral gear power steering system employing a power piston rack and a sector gear to provide an overall steering ratio which is lower in the center and higher at the ends.

Although minor modifications might be suggested by those versed in the art, it should be understood that we wish to embody within the scope of the patent warranted hereon all such modifications as reasonably come within the scope of our contribution to the art.

We claim as our invention:

1. A variable ratio integral power steering gear assembly comprising:
   a housing having a power cylinder formed therein,
   a power piston carried for reciprocal movement in said cylinder and having rack teeth formed thereon,
   a rotatable steering shaft mounted on said housing,
   valve means adapted for connection to a source of pressurized fluid and to the ends of said power cylinder for controlling the flow of fluid therebetween and comprising a pair of relatively movable valve elements, one of which is connected for synchronous movement to said steering shaft and the other of which is connected for synchronous movement to said power piston, and
   a cross-shaft adapted for connection to vehicular steering linkage and carried for rotation on said housing,
   said cross-shaft having sector gear teeth formed thereon in meshing relation with said rack teeth and constructed and arranged relative to said rack teeth so as to provide a lower overall steering ratio between said steering shaft and said cross-shaft in the center steering position of the assembly than in an end position thereof.

2. A variable ratio integral power steering gear assembly comprising:
   a housing having a power cylinder formed therein,
   a power piston carried for reciprocal movement in said cylinder and having rack teeth formed thereon,
   a rotatable steering shaft mounted on said housing,
   valve means adapted for connection to a source of pressurized fluid and to the ends of said cylinder for selectively controlling the flow of fluid therebetween and comprising a pair of relatively movable valve elements, one of which is connected for joint rotation to said steering shaft and the other of which is connected to said power piston for rotation movement in response to axial movement of said power piston, and
   a cross-shaft adapted for connection to vehicular steering linkage carried for rotation of said housing and having sector gear teeth in meshing relation with the rack teeth of said power piston,
   said teeth rack and said sector gear teeth being constructed and arranged to provide a steering ratio which increases as the assembly is turned from the center position thereof.

3. The invention as defined in claim 2 wherein the pitch line of the rack teeth is constant and the pitch radius of the teeth of the sector gear varies to provide said variable ratio.

4. A variable ratio power steering gear assembly for use in combination with vehicular steering linkage requiring increased torque input as the steered wheels are turned from the center toward the end positions thereof, said assembly comprising:
   a housing having a power cylinder formed therein,
   a power piston carried for reciprocal movement within said cylinder and having rack teeth formed thereon,
   a rotatable steering shaft mounted on said housing,
   valve means adapted for connection to a source of pressurized power fluid and to the ends of said cylinder for controlling the flow of fluid therebetween and comprising a pair of relatively movable valve elements, one of which is connected for joint rotation to said steering shaft and the other of which is connected to said power piston for rotation thereof in response to axial movement of said power piston, and
   shaft means rotatably mounted on said housing and adapted for mechanical connection to the vehicular steering linkage,
   and a sector gear on said shaft means engaged in meshing relation with the rack teeth on said power piston,
   said sector gear teeth and said rack teeth being constructed and arranged for providing said shaft means with a varying torque capability which tends to compensate for the varying torque requirements of the steering linkage while the pressure of the power fluid is maintained at a constant level.

5. The invention as defined in claim 4 wherein the pitch radius of the sector gear increases from the center to the ends thereof.

6. The invention as defined in claim 5 wherein the depth of the rack teeth at the ends of the rack is greater than the depth of the rack teeth at the center of the rack.

* * * * *